(12) United States Patent
Schmitt

(10) Patent No.: US 6,208,520 B1
(45) Date of Patent: Mar. 27, 2001

(54) METHOD FOR ALLOWING REDUNDANT AND NON-REDUNDANT POWER SUPPLIES IN THE SAME COMPUTER SYSTEM

(75) Inventor: Ty R. Schmitt, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/246,632

(22) Filed: Feb. 8, 1999

(51) Int. Cl.⁷ .................................. G06F 1/16; H05K 7/20
(52) U.S. Cl. ........................ 361/725; 361/731; 307/150
(58) Field of Search ........................... 307/150; 361/683, 361/724–732

(56) References Cited

U.S. PATENT DOCUMENTS

| | | | |
|---|---|---|---|
| 5,460,441 | 10/1995 | Hastings et al. | 312/298 |
| 5,513,062 | 4/1996 | Paul et al. | 361/90 |
| 5,612,854 | 3/1997 | Wiscombe et al. | 361/727 |
| 5,672,958 | 9/1997 | Brown et al. | 323/269 |
| 5,761,045 | 6/1998 | Olson et al. | 361/726 |
| 5,777,398 | 7/1998 | Valkeakari et al. | 307/66 |
| 6,040,982 * | 3/2000 | Gandre et al. | 361/724 |

* cited by examiner

Primary Examiner—Jeffrey Donels
(74) Attorney, Agent, or Firm—Skjerven Morrill MacPherson LLP; Margaret M. Kelton

(57) ABSTRACT

An apparatus, computer system and method allow either redundant power supplies or a non-redundant power supply to be mounted in a computer chassis, efficiently fitting into the same space.

The apparatus and computer system include a chassis with a power supply bay for holding one of a power supply of a first type and a plurality of power supplies of a second type wherein the power supply bay is capable of receiving either one of the power supply of the first type and the plurality of power supplies of the second type, the power supply of the first type fitting into the same space as the plurality of power supplies of the second type.

21 Claims, 5 Drawing Sheets

METHOD FOR ALLOWING REDUNDANT AND NON-REDUNDANT POWER SUPPLIES IN THE SAME COMPUTER SYSTEM

BACKGROUND OF THE INVENTION

1. Field of the Invention

The field of the present invention relates generally to enclosures, housings, and computer housings in particular. More specifically, the field relates to a computer chassis for supporting redundant and non-redundant power supplies in the same computer system.

2. Description of the Related Art

Personal computer systems in general and IBM compatible personal computer systems in particular have attained widespread use. These personal computer systems now provide computing power to many segments of today's modem society. A personal computer system can usually be defined as a desktop, floor-standing, or portable microcomputer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect these components together. These personal computer systems are information handling systems which are designed primarily to give independent computing power to a single user or group of users and are inexpensively priced for purchase by individuals or small businesses. One way of keeping the cost of computer systems down is to manufacture systems that use electrical parts in an efficient manner. Given the number of electrical devices in a computer system, such efficiency is paramount.

Among the many electrical parts that must be manufactured efficiently is the power supply. Many computer systems, including computer servers, use redundant power supplies to avoid user down-time in the event of a power supply failure. Other computer systems utilize non-redundant power supplies. Typically, manufacturers either assemble computer systems with a non-redundant power supply or they assemble computer systems with redundant power supplies. What is needed is a computer system capable of efficient assemblage with either redundant or non-redundant power supplies.

SUMMARY OF THE INVENTION

Accordingly, to address the deficiencies of the prior art, an apparatus, computer system and method allow either redundant power supplies or a single non-redundant power supply to be mounted in a computer chassis, efficiently fitting into the same space.

The apparatus and computer system include a power supply bay for holding either a power supply of a first type or a plurality of power supplies of a second type wherein the power supply bay is capable of receiving either the power supply of the first type or the plurality of power supplies of the second type, the power supply of the first type fitting into the same space as the plurality of power supplies of the second type. In an embodiment, the power supply of the first type is a non-redundant-type power supply and the power supplies of the second type are redundant-type power supplies.

According to an embodiment, the power supply of the first type is mounted to a sled. The sled has at least one retainer projecting from a first end of the sled. The power supply bay has at least one retainer aperture projecting from a wall of the power supply bay. The at least one retainer aperture is capable of receiving the at least one retainer portion of the sled and bracing the plurality of power supplies of the second type. Bracing of the plurality of power supplies of the second type is accomplished through each power supply of the second type having a notched end shaped to brace against the at least one retainer aperture.

According to an embodiment, a computer system includes a processor, a memory coupled to the processor, and a power supply system for supplying power to the processor and the memory. The power supply system includes the power supply bay discussed above.

A method of supplying a power supply system includes providing a power supply bay for holding either a power supply of a first type or a plurality of power supplies of a second type and providing the power supply bay with a shape capable of receiving either one of the power supply of the first type or the plurality of power supplies of the second type. The power supply of the first type fits into the same space as the plurality of power supplies of the second type. The method includes mounting the power supply of the first type to a sled. The sled has at least one retainer projecting from a first end of the sled and provides the power supply bay with at least one retainer aperture projecting from a wall of the power supply bay. The retainer aperture is capable of receiving the retainer and of bracing the plurality of power supplies of the second type. The method also includes providing each of the power supplies in the plurality of power supplies of the second type with a notched end shaped to brace against the retainer aperture for holding the power supplies in place.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out embodiments described. The description is intended to be illustrative of the invention and should not be taken to be limiting.

Figure 1:
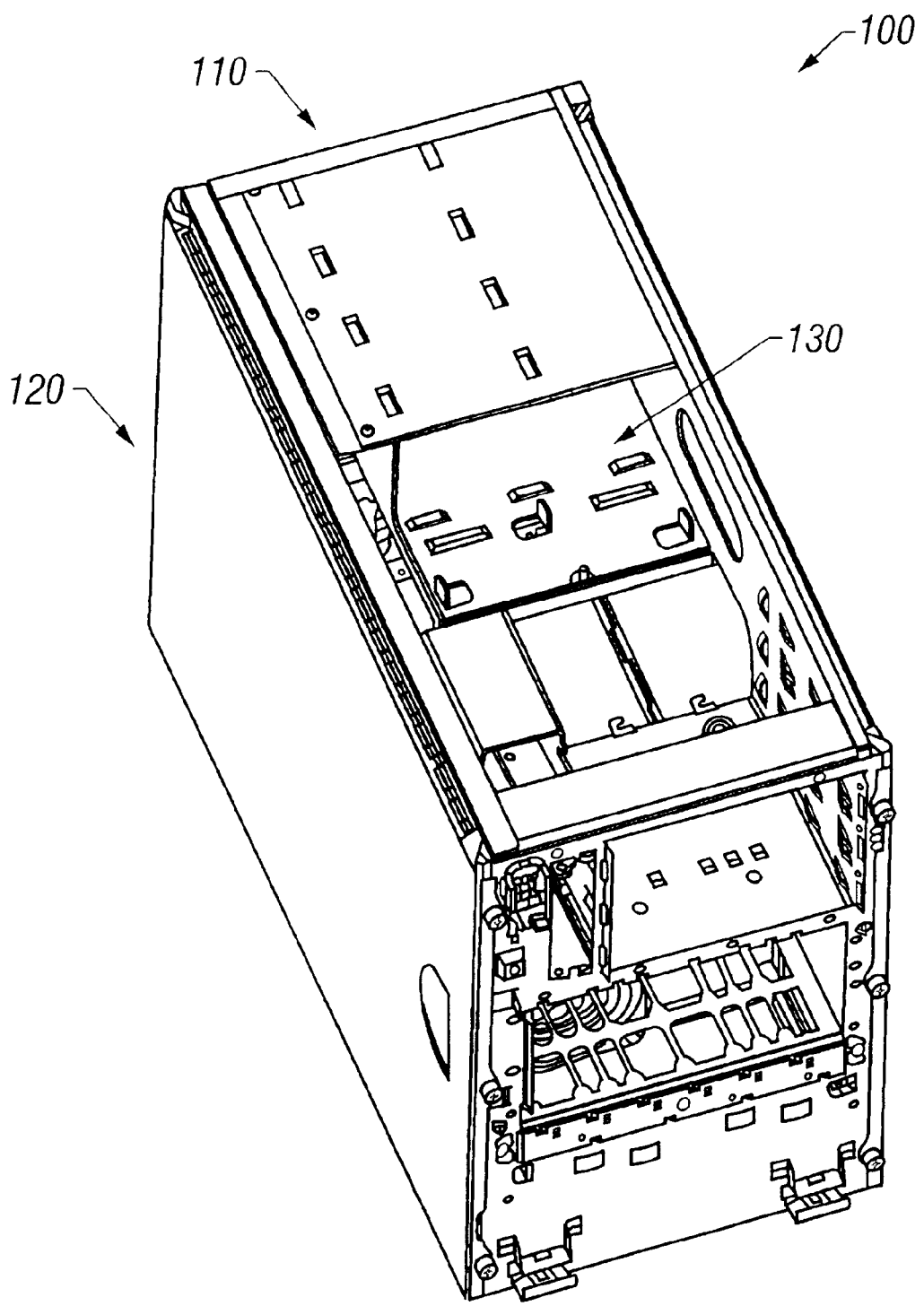
FIG. 1 is an isometric top view of the computer system of the present invention with the power supply bay vacant.

Referring to FIG. 1, a computer system chassis 100 shows a vacant power supply bay. The computer chassis 100 is a "tower" model, however, one of ordinary skill appreciates that other designs are within the scope of the embodiments presented. The computer system typically present in the computer system chassis 100 is of the server type, however it is understood that other types of computer systems, for example, personal computer systems would benefit from the embodiments herein presented. A typical computer system includes system processor 140 that is electrically coupled to memory 150. The power for the processor and memory is supplied by a power supply system.

The computer chassis 100 has a power supply bay 110 preferably positioned at the rear end 120 of the computer chassis 100. The power supply bay 110 has a generally rectangular shape and is formed so that either a single power supply or a plurality of power supplies fit into the same space that defines the power supply bay 110. The power supply bay has formed therein retainer apertures 130 shown on the floor of the power supply bay 110. The retainer apertures 130 are shown as a plurality of retainer apertures. The retainer apertures 130 are configured to either receive a retainer for a single power supply or to be used as braces for the ends of a plurality of power supplies. Although a plurality of retainer apertures 130 are shown, it will be appreciated that there may be one retainer and retainer aperture if desired.

Behind the retainer apertures 130 of the power supply bay 110 a protruding ledge 140 is shown. The ledge 140 is for the placement of circuit board cards or a single circuit board card (not shown) that couple to power supplies. On the ledge 140 are guides 150 for positioning circuit board cards placed on the ledge 140. The circuit board cards provide the wiring required for the power supply system.

Figure 2:
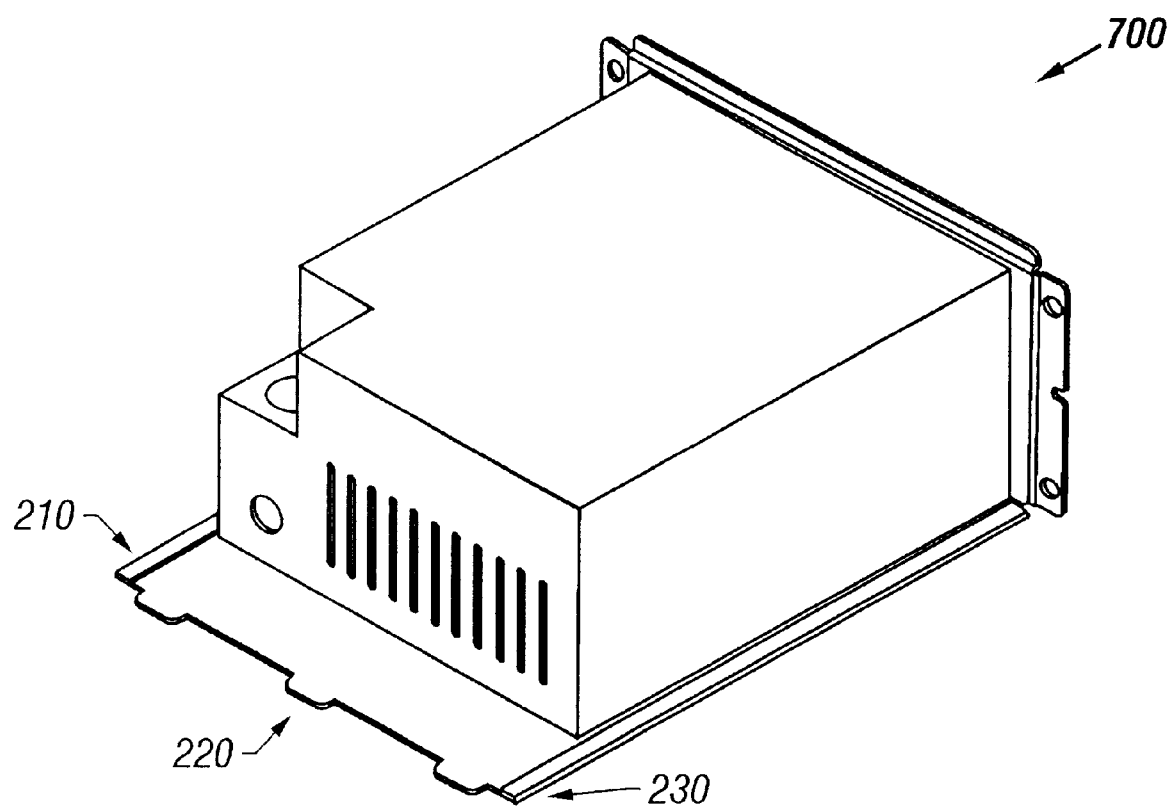
FIG. 2 is an isometric view of a non-redundant power supply.

Referring to FIG. 2 in combination with FIG. 1, an isometric view of a single power supply 200 is shown in which a non-redundant power supply is mounted to a sled 210. The sled 210 has at least one retainer member 220 projecting from an end of the sled 230 coupling the power supply 200 to the retainer apertures 130 in the power supply bay 110. The power supply 200 has a generic rectangular shape with similar dimensions to the power supply bay 110 for efficient fitting of the single power supply 200 into the power supply bay 110. The single power supply 200 is a non-redundant-type power supply. Typically, non-redundant power supplies do not couple to a circuit board card, but connect directly to power supply cabling systems located in the computer chassis 100.

The at least one retainer aperture 130 is designed to receive the at least one retainer member 220. As shown, a plurality of retainer apertures 130 receive a plurality of retainer members 220, thereby presenting an efficient method of securing a power supply.

Figure 3:
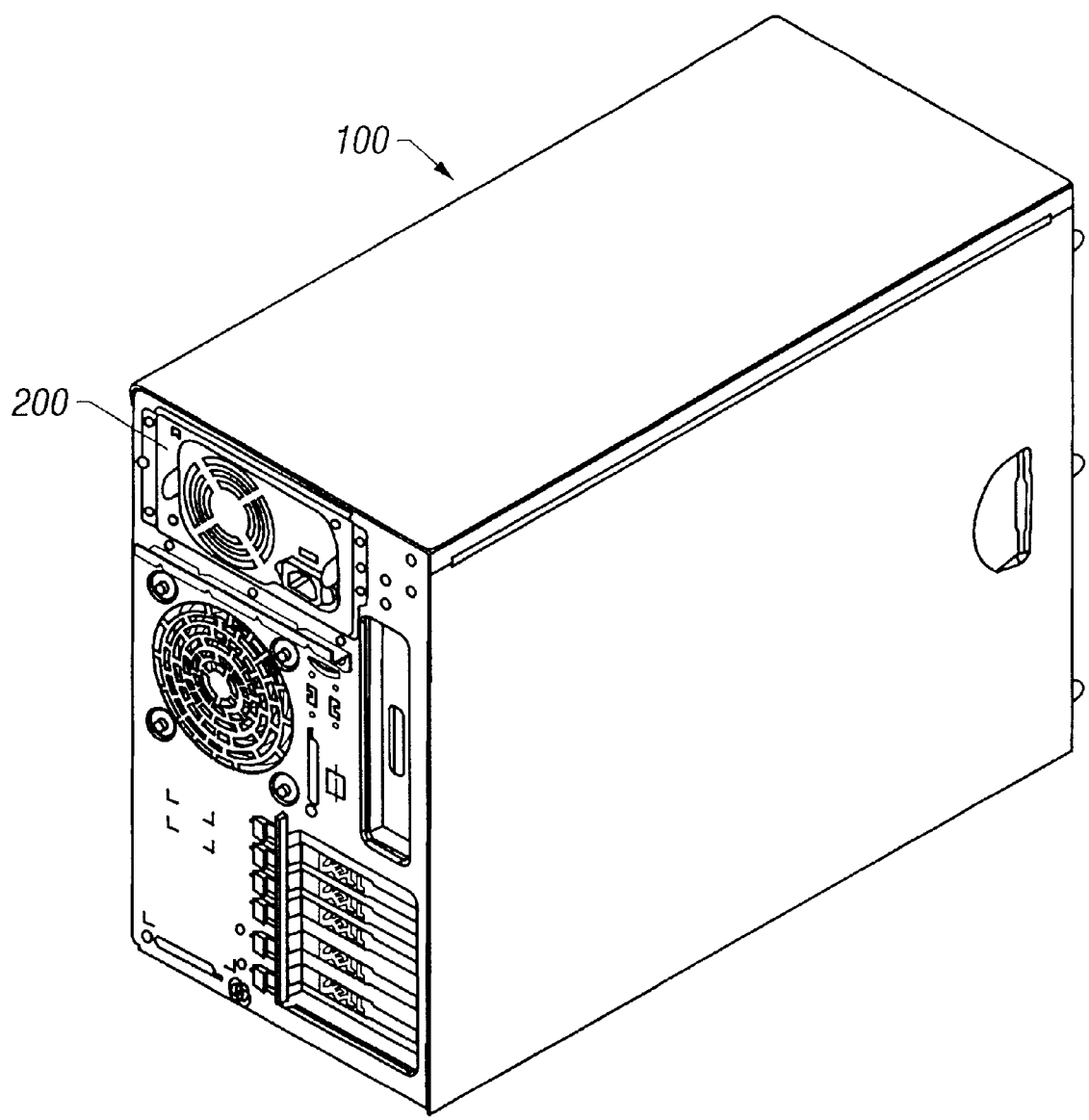
FIG. 3 is an isometric view of a non-redundant power supply located within the power supply bay shown in FIG. 1.

Referring to FIG. 3, a computer system shows the non-redundant power supply 200 installed into the computer chassis. The power supply 200 is installed by sliding the power supply 200 into the power supply bay 110 shown in FIG. 1.

Figure 4:
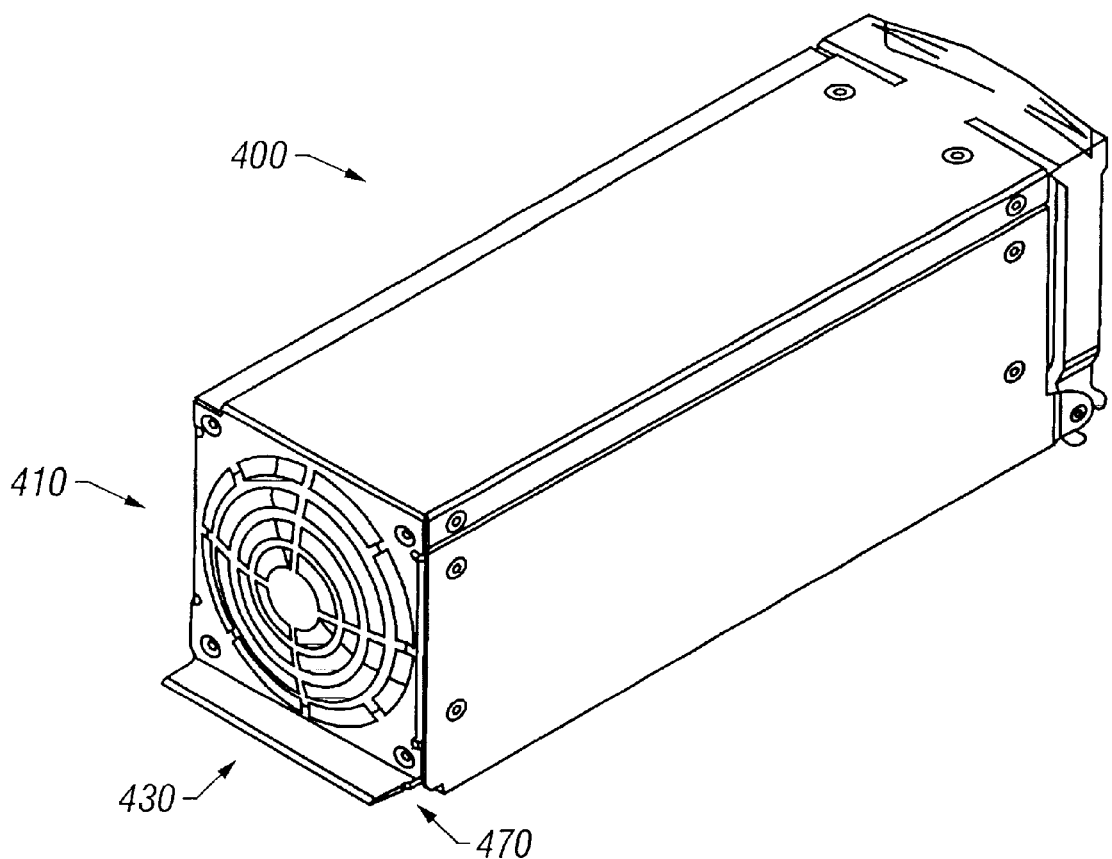
FIG. 4 is an isometric view of a hot plug redundant power supply.

Turning to FIG. 4 in combination with FIG. 1, there is illustrated a redundant "hot plug" power supply 400. A "hot plug" power supply is one that allows the transfer from one power supply to another while the system is "hot" or running. The "hot plug" power supply 400 shown takes up roughly half the space of the power supply bay 110, thereby allowing installation of two redundant "hot plug" power supplies 400. The "hot plug" power supply 400 is shown with an interior end 410 that couples to the circuit board card discussed above via the connector 430 shown at the end 410. Below the end 410 is a dog-legged corner 320 designed to provide a lip over which the end 310 protrudes. The edge of the dog-legged corner 420 is placed to brace the retaining apertures 130 located in the floor of the power supply bay 110. The retaining apertures 130 thereby provide a brace for the redundant "hot plug" power supplies.

Figure 5:
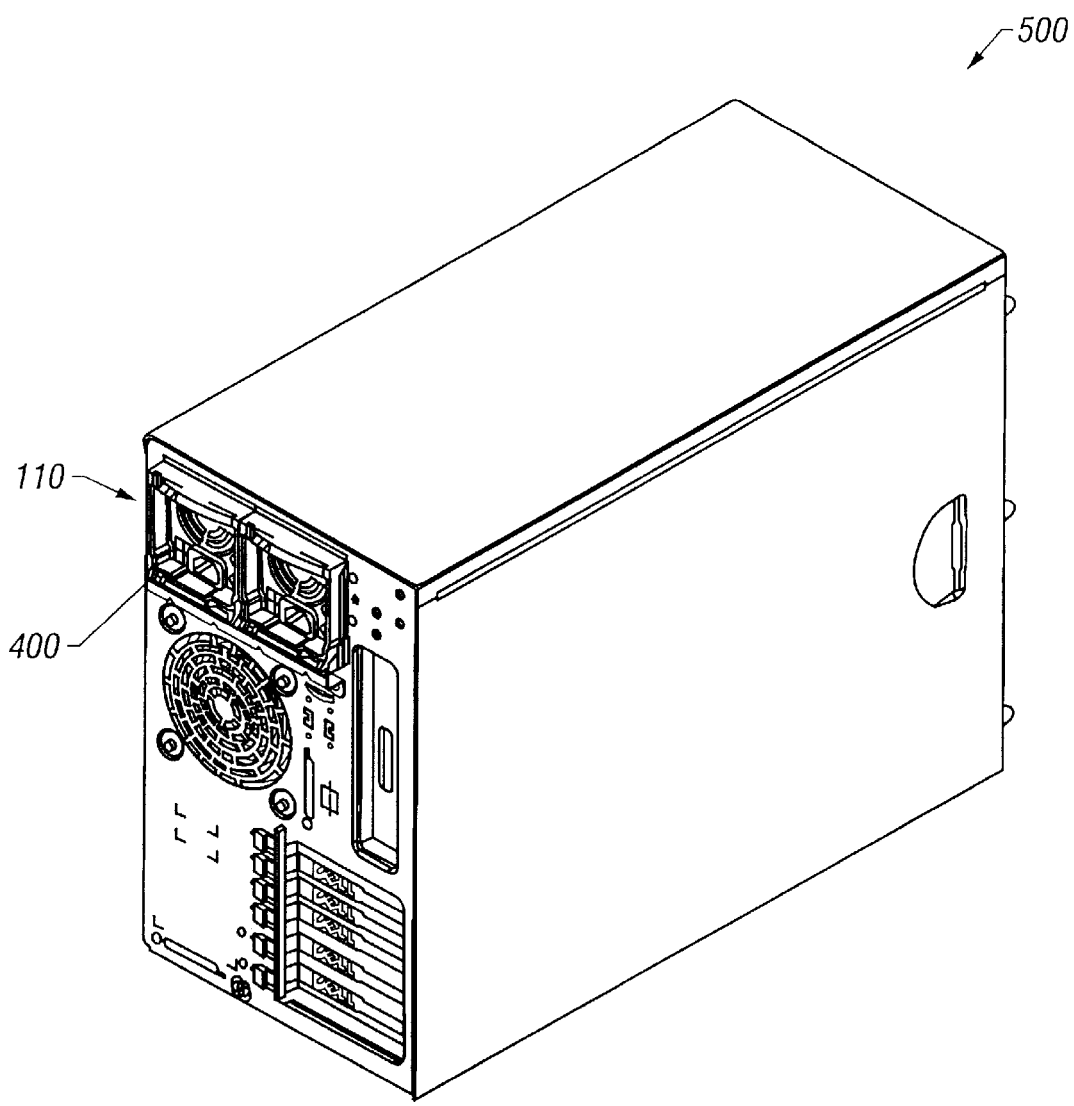
FIG. 5 is an isometric view of the computer system showing two hot plug redundant power supplies within the system.

Referring to FIG. 5, an isometric view of computer system 500 shows two redundant "hot plug" power supplies 400. The power supply bay 110 is the same power supply bay 110 into which the single non-redundant power supply fits into as shown in FIG. 3.

Referring now to FIGS. 1–5, a method for manufacturing the present embodiments is described. Typically, a computer chassis 100 is of metal and a power supply bay 110 is formed as part of the computer chassis 100. The method includes providing for a power supply bay that holds either a power supply of a first type or a plurality of power supplies of a second type. The method further includes providing the power supply bay with a shape capable of receiving either one of the power supply of the first type or the plurality of power supplies of the second type, the power supply of the first type fitting into the same space as the plurality of power supplies of the second type. In an embodiment, the first type of power supply is a larger, non-redundant power supply; the second type of power supply is a smaller, redundant power supply.

A single or plurality of retainer apertures may be formed by cutting lances in the floor of the power supply bay. The retainer aperture receives a retainer coupled to the power supply. In an embodiment, a plurality of retainer apertures receive a plurality of retainers coupled to a single non-redundant power supply. The method includes mounting the power supply of the first type to a sled, the sled having at least one retainer projecting from a first end of the sled and providing the power supply bay with at least one retainer aperture projecting from a wall of the power supply bay. The retainer aperture is capable of receiving the at least one retainer portion of the sled and of bracing the plurality of power supplies of the second type. The retainer apertures may be placed in the floor of the power supply bay. The retainer portions and the sled may be located on the bottom of a non-redundant power supply.

In order for the retainer apertures to function as both retainer apertures for the first type of power supply and as a brace for the plurality of power supplies, the method includes providing each of the power supplies in the plurality of power supplies of the second type with a notched end shaped to brace against at least one retainer aperture.

A power supply 200 is formed coupled to a sled on the floor of the power supply, the sled formed with either a single retainer or a plurality of retainers for coupling the power supply to the floor of the power supply bay 110. The sled may be formed to allow coupling of the power supply and sled to the roof or side wall of the power supply bay 110 if appropriate changes are made to the retainer apertures inside the power supply bay 110.

A plurality of redundant, "hot plug", power supplies are formed, each with a notched end for bracing the retainer apertures to the at least one retainer aperture for mechanically coupling the sled to the bay and the at least one retainer aperture capable of bracing the plurality of power supplies inside the bay.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. An apparatus comprising:
    a chassis enclosing a power supply bay capable of receiving either one of a power supply of a first type and a plurality of power supplies of a second type, the power supply of the first type fitting into the same space as the plurality of power supplies of the second type.

2. The apparatus of claim 1, wherein the power supply of the first type is mounted to a sled, the sled having at least one retainer portion projecting from a first end of the sled.

3. The apparatus of claim 1, wherein the power supply of the first type is a non-redundant-type power supply.

4. The apparatus of claim 2, wherein the power supply bay has at least one retainer aperture projecting from a wall of the power supply bay, the at least one retainer aperture capable of receiving the at least one retainer portion of the sled.

5. The apparatus of claim 2, wherein the power supply bay has at least one retainer aperture projecting from a wall of the power supply bay, the at least one retainer aperture capable of receiving the at least one retainer portion of the sled and bracing the plurality of power supplies of the second type.

6. The apparatus of claim 5, wherein the plurality of power supplies of the second type have a notched end shaped to brace against the at least one retainer aperture.

7. The apparatus of claim 5, wherein ones of the plurality of power supplies of the second type have a notched end shaped to brace against the at least one retainer aperture, the notched end shaped to allow ones of the plurality of power supplies of the second type to couple to a circuit board card coupled to the power supply bay.

8. The apparatus of claim 5, wherein the plurality of power supplies of the second type are redundant-type power supplies.

9. A computer system comprising:
    a processor;
    a memory coupled to the processor;
    a chassis for retaining the processor and the memory; and
    a power supply system for supplying power to the processor and the memory, the power supply system including a power supply bay formed in the chassis for holding one of a power supply of a first type and a plurality of power supplies of a second type wherein the power supply bay is capable of receiving one of the power supply of the first type and the plurality of power supplies of the second type, the power supply of the first type fitting into the same space as the plurality of power supplies of the second type.

10. The computer system of claim 9, wherein the power supply of the first type is mounted to a sled, the sled having at least one retainer portion projecting from a first end of the sled.

11. The computer system of claim 9, wherein the power supply of the first type is a non-redundant-type power supply.

12. The computer system of claim 10, wherein the power supply bay has at least one retainer aperture projecting from a wall of the power supply bay, the at least one retainer aperture capable of receiving the at least one retainer portion of the sled.

13. The computer system of claim 10, wherein the power supply bay has at least one retainer aperture projecting from a wall of the power supply bay, the at least one retainer aperture capable of receiving the at least one retainer portion of the sled and of bracing the plurality of power supplies of the second type.

14. The computer system of claim 13, wherein ones of the plurality of power supplies of the second type have a notched end shaped to brace against the at least one retainer aperture.

15. The computer system of claim 13, wherein ones of the plurality of power supplies of the second type have a notched end shaped to brace against the at least one retainer aperture, the notched end shaped to allow ones of the plurality of power supplies of the second type to couple to a circuit board card that is coupled to the power supply bay.

16. The computer system of claim 9, wherein the plurality of power supplies of the second type are redundant-type power supplies.

17. A method for providing a power supply system comprising:
    providing a chassis with a power supply bay for holding one of a power supply of a first type and a plurality of power supplies of a second type; and
    providing the power supply bay with a shape capable of receiving either one of the power supply of the first type and the plurality of power supplies of the second type, the power supply of the first type fitting into the same space as the plurality of power supplies of the second type.

18. The method of claim 17, further comprising:
    mounting the power supply of the first type to a sled, the sled having at least one retainer portion projecting from a first end of the sled
    providing the power supply bay with at least one retainer aperture projecting from a wall of the power supply bay, the at least one retainer aperture capable of receiving the at least one retainer portion of the sled and of bracing the plurality of power supplies of the second type; and
    providing ones of the power supplies in the plurality of power supplies of the second type with a notched end shaped to brace against the at least one retainer aperture.

19. The method of claim 18, wherein ones of the plurality of power supplies of the second type have a notched end shaped to brace against the at least one retainer aperture, the notched end shaped to allow ones of the plurality of power supplies of the second type to couple to a circuit board card coupled to the power supply bay.

20. The method of claim 17, wherein the plurality of power supplies of the second type are redundant-type power supplies.

21. The method of claim 17, wherein the power supply of the first type is a non-redundant-type power supply.

* * * * *